Patented July 10, 1934

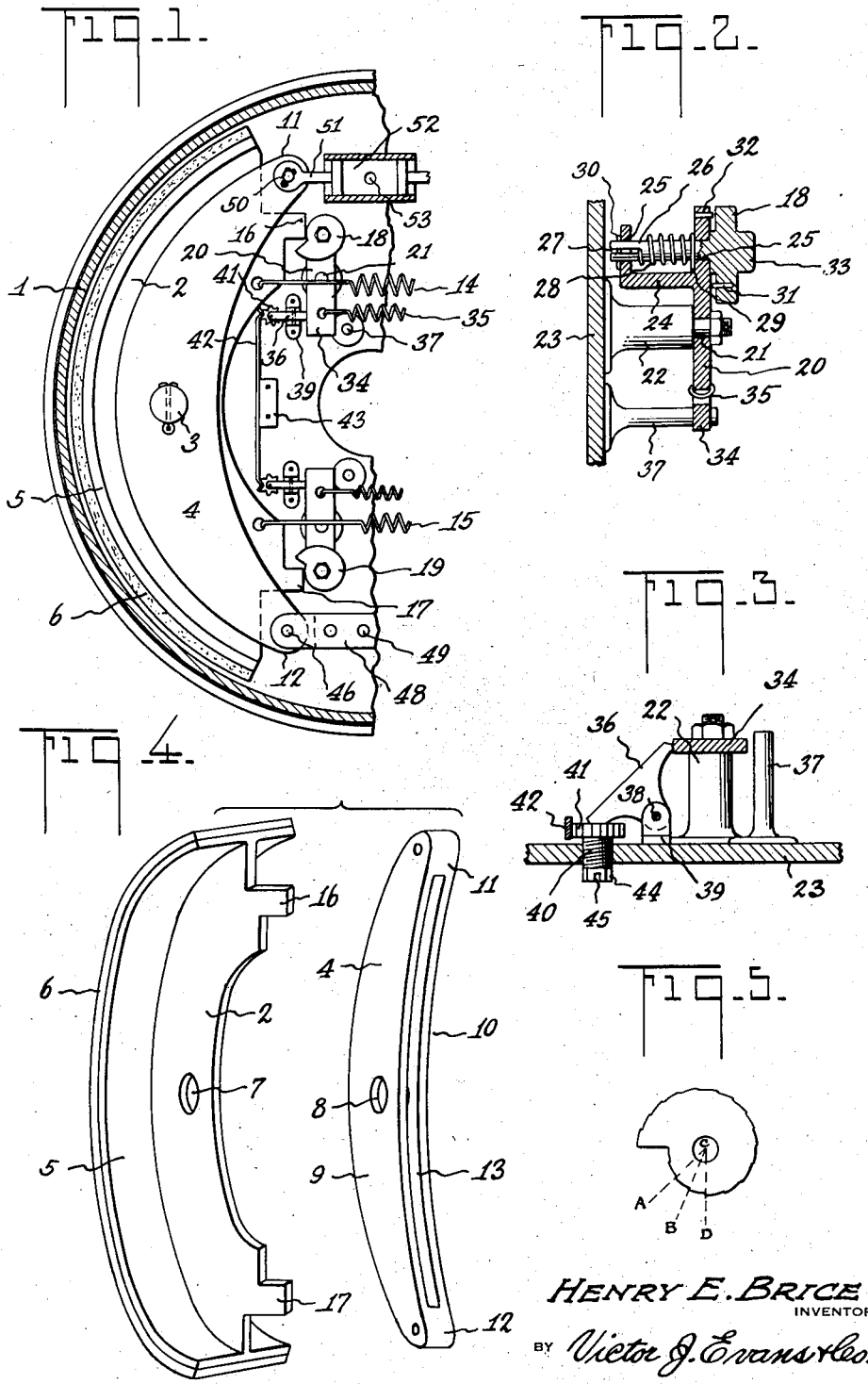

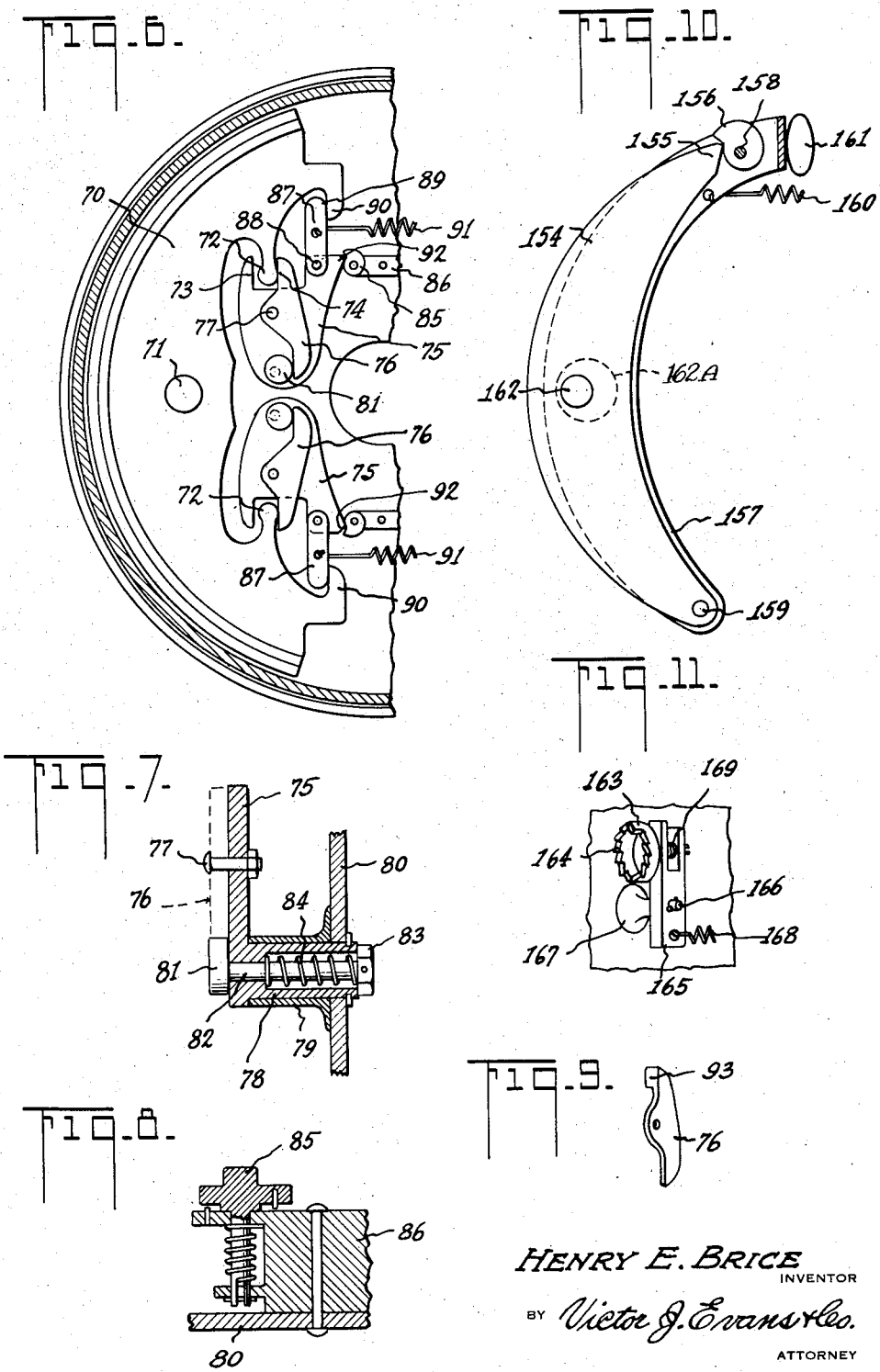

1,966,375

UNITED STATES PATENT OFFICE

1,966,375
AUTOMATIC BRAKE ADJUSTER
Henry E. Brice, New York, N. Y.

Application July 21, 1933, Serial No. 681,610

6 Claims. (Cl. 188—79.5)

This invention relates to automatic brake adjusters and it has for one of its objects the provision of means whereby the type of automatic brake adjuster shown in my previous Patent No. 1,900,791, may be applied to the entire adjustable friction member, instead of to one end only of a pivoted brake shoe as was shown in that patent.

A further object is to so change the construction and action as to provide means whereby that part of the adjustment which is manually controlled may be adjusted from behind the backplate instead of through a hole, as was necessary with the previously-mentioned patent.

A further object consists in providing means in conjunction with the use of an adjusting cam, such as was shown in the mentioned patent, whereby pressure against the cam shall be free from any urge to rotate it out of adjustment.

A further object is to provide equality of pressure and movement throughout the entire friction member, instead of the varying pressure and movement which are imparted to the various positions along a brake shoe which is pivoted at one end only.

These and other objects are attained in the device shown in the accompanying drawings, in which:

Fig. 1 is an elevation, partly in section, of one form of my device.

Fig. 2 is an enlarged section of the adjustable cam arrangement shown in Fig. 1.

Fig. 3 is an enlarged section of the adjustable stop arrangement shown in Fig. 1.

Fig. 4 is a perspective view of the brake shoe and service lever shown in Fig. 1.

Fig. 5 is an enlarged elevational view of a modified cam.

Fig. 6 shows a preferred form of my invention and is similar to Fig. 1.

Fig. 7 is an enlarged sectional view of the eccentric cam arrangement shown in Fig. 6.

Fig. 8 is an enlarged sectional view of the cam arrangement shown in Fig. 6.

Fig. 9 is a perspective of the pivoted member shown in Fig. 6.

Fig. 10 shows another modified form of braking arrangement; and

Fig. 11 is a perspective view of still another form of adjustable cam arrangement.

Referring to the drawings for a more detailed description thereof, and at first to Figs. 1 to 5, inclusive, 1 indicates a revolving drum, 2 indicates a brake shoe pivoted by means of the clevis pin 3 to a service lever 4. The shoe 2 has a flange 5 to which may be attached a friction lining 6 by means of the usual rivets, not shown in the drawings.

The shoe 2 and the service lever 4 are best shown in perspective in Fig. 4. The holes 7 and 8, in the brake shoe and service lever respectively, shown in this figure, receive the clevis pin 3. It may be seen from Fig. 4 that the service lever 4 consists of two flat plates 9 and 10, jointed at their ends 11 and 12, with a space 13 between them. In this space 13 the shoe 2 is disposed as shown in Fig. 1.

The shoe 2 has two projections 16 and 17 (Fig. 1) which are kept pressed against two adjusting cams, 18 and 19, respectively, by the tension of springs 14 and 15. The other ends of these springs may be either attached to some fixed member or to another shoe in opposition, not shown in the drawings.

The operation of these cams being both alike, the description of one of them, cam 18, will be sufficient. This cam is rotatably mounted on a rocking member 20, pivoted at 21 (see Fig. 2) to a member 22 which is riveted to the backplate 23. This rocking member has an enlarged portion 24 in which are holes 25 through which passes a shaft 26 of the cam 18. The end of this shaft is slotted at 27 and to this slot is hooked one end of a torsional spring 28, the other end 29 of which rests against the body of the rocking member 20. A cotter pin 30 keeps the shaft from sliding out. A stud 31 in the cam is intended to strike another stud 32 in the rocking member and prevent the cam from turning beyond a certain point. Before the cotter pin 30 is inserted, the proper tension is given to the spring 28, by turning the cam 18, so that studs 31 and 32 press tightly against each other. Before the drum is put on, each cam is turned in the position shown in Fig. 1, with its narrow side against the shoe. The spring 28 will then try to turn the cam, but pressure of the shoe, caused by the springs 14 and 15, will normally prevent this turning. A projection 33, preferably shaped to fit a wrench, is provided as a means for turning the cam.

The other end 34 of the rocking member 20 is tensioned by a spring 35, best shown in Fig. 1. The other end of this spring may be attached to a similar opposite rocking member, not shown. This spring 35 is made very much weaker than the spring 14. Turning to Fig. 3, we find that the end 34 is allowed a limited amount of motion between an adjustable stop 36 and a fixed stop 37, which is riveted to the backplate 23. Owing to the difference in strength between the two springs, spring 14 normally causes the end 34 to be pressed against the adjustable stop 36, as shown in Figs. 1 and 3. When the shoe 2 is moved toward the drum, however, the spring 35 pulls the end 34 till it rests against stop 37. Thus the end of the rocking member 20 which carries the adjusting cam 18 follows the shoe in its movement toward the drum. When wear of the friction lining 6 causes the shoe to keep on traveling toward the drum after the end 34 has reached the stop 37, the cam 18 is turned by its torsional spring 28.

When the shoe is again pulled back by its springs 14 and 15, it drives the cam 18 back to the right again, against the tension of spring 35, rocking the rocking member on its pivot 21 till the end 34 again touches the adjustable stop 36. Owing to the fact that the cam has turned, however, the shoe is not as far to the right as it was before, and the turning of the cam has compensated for the wear of the lining 6. Each time the shoe is moved toward or away from the drum, the member 20 is thus rocked. Each time that wear of the lining allows the shoe to move a little further, the cam turns to compensate for it. When the lever 4 is moved to the left, it carries the shoe with it by means of the clevis pin 3, against the tension of springs 14 and 15. It is not likely that the tension of these springs shall be so equal as to allow the lining to engage the drum throughout its entire length at the same time. Instead, one end of the shoe will probably yield before the other so the shoe will rock slightly on pivot 3, whereupon one end of the lining will touch first. The lining is expected to be always so close to the drum that this rocking is insignificant. If further pressure is then applied, however, the shoe will rock again slightly and the lining will take hold along its entire length. As the lining is pressed tightly against the drum, that pressure is bound to then be equal throughout, because it is applied at the middle, at a pivotal point which allows freedom of the shoe to rock and make a greater pressure at one end of the shoe than at the other impossible.

The adjustable stop 36, shown in Fig. 3, is pivoted at 38 to a bracket 39 which is riveted to the backplate 23. A threaded bolt 40, which is screwed in this backplate, serves the purpose of adjusting the position of this stop. The inner end 41 of this bolt is provided with teeth, against which presses a free end of a springy piece of metal 42, shown in Fig. 1, which is riveted to the backplate at 43. This spring thus keeps the bolt in whatever position it is turned. The outer end of the bolt is provided with a contour 44, shaped to fit a wrench, and also with a slot 45 so it may be turned by a screw-driver.

In the form shown in Fig. 1, the service lever 4 is pivoted at 46 to a bracket 48 which is bolted to the backplate at 49. The other end 50 of this lever is pivoted to a piston 51 slidable in a cylinder 52. Brake fluid entering through an aperture 53 forces the piston to move and moves the service lever 4.

In Fig. 5, I show a modification of the shape of the adjusting cams themselves. It may be feared that with the form shown in Fig. 1 the pressure against cams 18 and 19 may cause them to revolve, also cam 156 of Fig. 10. In Fig. 5, the surface of the cam is divided into a number of small parts, such as those which lie between the radii AC—BC, or BC—DC. The surface of each of these parts is made perfectly concentric with the axis C. Thus pressure against any of these parts can give no urge to turn. The cam is given the appearance of a ratchet, but its function is somewhat different from that of an ordinary ratchet, for in this case the ratchet shape is purely a consequence and not an object, the object being the concentric shape mentioned.

In Figs. 6, 7, 8 and 9 I show a preferred form of my invention. The shoe 70 is provided with a hole 71, for the purpose of a pivotal connection with a service lever, not shown, like that of Fig. 1. The upper end of the shoe has a projection 72 which lies between two edges, 73 and 74, with a limited amount of free space between them. Edge 73 is on a rocking member 75. Edge 74 is on a pivoted member 76, pivoted at 77 to the rocking member 75.

The shape of member 76 is shown in perspective in Fig. 9. Its raised portion 93 is the part intended for contact with projection 72. The rocking member 75 has a cylindrical portion 78, shown in Fig. 7, which runs through and turns freely in a bracket 79, which is riveted to the backplate 80, and also runs through and turns in the backplate itself.

An eccentric 81, shown in Fig. 7, is mounted on a shaft 82, the other end of which is provided with a wrench-fitting head 83. This shaft runs through a cylindrical opening in the cylindrical projection 78, a portion of which opening is enlarged to receive a compression spring 84, whose purpose is to keep the eccentric in any position in which it is turned. This eccentric 81 is used for adjusting the pivotal member 76, so as to increase or decrease the distance between the edges 73 and 74, and thus provide a manual adjustment to accompany the automatic one.

A cam 85, as shown in Fig. 8, operates on the same principle as the cam 18 of Fig. 1, as far as concerns its rotation on its axis. The axis of the cam 85 is rotatably mounted in a fixed bracket 86, fixed to the backplate 80. The cam 88 is turned by spring means in this bracket just as the cam of Figs. 1 and 2 is turned.

A rocking spring-holder 87 has one end pivoted at 88 to the rocking member 75 and the other end 89 hooked under a ledge 90 on the shoe. A tension spring 91 is hooked in the middle of this spring-holder. The other end of this spring may be similarly hooked to a corresponding spring-holder, not shown.

Before the lining becomes worn, the projection 72 merely moves from edge 74 toward edge 73 whenever the brake is put on. While this occurs the spring holder 87 rocks but at the same time keeps the nose 92 of the rocking member against cam 85 because of the tension of spring 91. When wear occurs and allows the shoe to move further, projection 72 presses edge 73 and carries it with it, rocking member 75 and pulling nose 92 away from the cam. The cam then turns in response to its spring urge described in connection with the other figures, and when the brake is released and projection 72 returns to the right against edge 74, it finds that edge a shade further to the left than it was before wear occurred. A similar device controls the other end of the shoe.

In the modification shown in Fig. 10, a service lever 154 which is intended to be of the same form as lever 4, except that its upper end 155, instead of being moved by a piston rests against another adjusting cam 156, as shown. This cam 156 is carried by a secondary service lever 157, to which it is rotatably mounted on its pivot 158.

This cam 156 may be of the same type as those shown in Figs. 1 and 2, though its operating mechanism is not shown in Fig. 10. The secondary service lever 157 is pivoted to the backplate at the same point as lever 154, at 159. A spring 160 keeps lever 157 always pressed against a cam 161. Turning the cam 161 will move lever 157, which carries cam 156 with it, thereby moving lever 154. In the modification shown in Fig. 10, only the service levers and means of applying power are changed, it being intended that the same type of brake shoes and adjusting means shown in Figs. 1 or 6 shall be used in conjunction therewith.

When wear of the lining has resulted in the previously-described self-adjustment of the cams 18 and 19 in Fig. 1, and the shoe 2 has not been allowed to return as far to the right as it was originally, the service lever 4 of Fig. 1 is not allowed to return as far to the right either, by reason of its pivotal connection through the clevis pin 3.

If, then, we substitute the lever 154, shown in Fig. 10, for the lever 4, and pass the clevis pin through the hole 162, the motion to the right of lever 154 will be similarly limited when adjustment of cams 18 and 19 take place. Then, since the secondary lever 157 always returns to its position against cam 161, the adjusting cam 156 will be turned by its spring, not shown, like spring 28 of Fig. 2, and widen the distance between end 155 and the pivot 158. The hole 162A in the lever 157 is for the purpose of allowing freedom of movement to the ends of this pin passed thru hole 162.

In Fig. 11 is shown another type of cam 163, intended to press against the shoe instead of cams 18 or 19. A type somewhat similar to this was also shown in the previously-mentioned patent, except that it was not provided with the series of steps shown here. The steps 164 are for the same purpose as the steps of Fig. 5, namely to assure that pressure against the cam will not cause it to turn. Cam 163 is carried by a rocking member 165, pivoted at 166 to a stationary support 167. This rocking member plays the same part as the one previously numbered 20, and is under tension of a spring 168 which fills the same part as spring 35. A torsional spring 169 turns the cam like the spring 28 of Fig. 2.

What is claimed is:

1. A revolving drum and a brake shoe adapted to be pressed together for braking purposes, retracting means for drawing the shoe away from the drum, a service lever for moving the shoe toward the drum, a pair of stops for limiting the retraction of the shoe away from the drum, and a pivotal connection interposed at some point between these stops and connecting the shoe with the service lever, so the shoe in being pressed toward the drum may rock on this connection and the pressure supplied by the service lever shall be evenly distributed throughout the shoe.

2. A revolving drum and a brake shoe adapted to be pressed together for braking purposes, retracting means for drawing the shoe away from the drum, a service lever for moving the shoe toward the drum, a pair of automatically adjustable stops each of which controls the amount of retraction allowed one end of the shoe, and a pivotal connection approximately at the middle of the shoe and connecting the shoe with the service lever, so the shoe may rock on this connection and the pressure may be evenly distributed throughout the shoe.

3. A revolving drum and a brake shoe adapted to be pressed together for braking purposes, a service lever for moving the shoe toward the drum, a pivotal connection about at the middle of the shoe and connecting the shoe with the lever so that pressure applied by the lever shall be evenly distributed throughout the shoe, retracting means for drawing the shoe away from the drum, and a pair of automatically adjustable stopping means each of which controls the amount of retraction allowed one end of the shoe, each stopping means containing a variable spacer capable of turning on its axis, a contact part pressing against this spacer, spring means constantly urging the spacer to turn but normally prevented from turning it by the pressure of the contact part, and means whereby wear caused by braking friction will momentarily release this pressure so the spacer shall be free to rotate in response to its spring urge, and space a wider distance between its own axis and the contact part than existed before wear occurred.

4. A pair of relatively movable friction members with coacting friction faces adapted to be pressed together for braking purposes, means for pressing these faces together, retracting means for separating them, and automatic means for controlling the extent of this separation, said automatic means including a variable spacer with an axis on which it may turn, a contact part ordinarily pressing against this spacer by pressure supplied by the retracting means but having a movement in a direction away from the spacer when the friction faces are pressed together and having an occasional further movement of this kind when wear occurs to these faces, spring means for turning the spacer and constantly urging it to turn, but ordinarily prevented from turning it by pressure of the contact part, a stop for preventing that pressure from driving the spacer beyond a certain point, secondary spring means for moving the spacer's axis in the same direction as the contact part and thus causing the spacer to follow up that part during the movement which accompanies the pressing of the friction faces together, and a secondary stop for arresting this follow-up movement at a certain point when the occasional further movement resulting from wear of the faces occurs, so that as the contact part then moves on unfollowed by the spacer's axis, it momentarily ceases pressure against the spacer and leaves that spacer free to turn in response to its spring means so as to prevent the contact part from returning as near to the spacer's axis as it was before wear occurred.

5. A device such as described in claim 4, in combination with manually adjustable means for controlling one of the stops mentioned therein.

6. In an automatic brake adjuster for use in connection with a brake which includes coacting friction members, a variable spacer capable of turning on its axis, a contact part ordinarily pressing against this spacer but momentarily ceasing this pressure after wear has occurred when the friction members are pressed together, a contact surface on the spacer in contact with the contact part, a plurality of steps on this surface, each step of which is on the arc of a circle, concentric with the spacer's axis and each step of which, beginning with one nearest the axis, is further from the axis than the preceding one, spring means for rotating the spacer and constantly urging it to turn but normally prevented from turning it by the pressure of the contact part against one of the steps of the contact surface, so that when the contact part momentarily ceases this pressure, then the spacer will be free to turn in response to its spring means and prevent the contact part from returning to the position it formerly occupied, by placing in its path a step on said spacer further removed from said axis.

HENRY E. BRICE.